US008555814B2

(12) United States Patent
Parks et al.

(10) Patent No.: US 8,555,814 B2
(45) Date of Patent: *Oct. 15, 2013

(54) ANIMAL FEED/WATER DISPENSER WITH DUAL-USE INVERTIBLE BASE

(75) Inventors: Linda Parks, Napa, CA (US); Michael Dominic Risso, Napa, CA (US)

(73) Assignee: Lixit Corporation, Napa, CA (US)

(*) Notice: Subject to any disclaimer, the term of this patent is extended or adjusted under 35 U.S.C. 154(b) by 149 days.

This patent is subject to a terminal disclaimer.

(21) Appl. No.: 13/135,825

(22) Filed: Jul. 15, 2011

(65) Prior Publication Data

US 2012/0132143 A1 May 31, 2012

Related U.S. Application Data

(63) Continuation-in-part of application No. 12/928,018, filed on Nov. 30, 2010.

(51) Int. Cl.
*A01K 5/00* (2006.01)
*A01K 7/00* (2006.01)

(52) U.S. Cl.
USPC ........................................ 119/51.5; 119/51.01

(58) Field of Classification Search
USPC ................... 119/51.01, 51.5, 52.1, 53, 53.5
See application file for complete search history.

(56) References Cited

U.S. PATENT DOCUMENTS

| 3,720,184 | A | * | 3/1973 | Pearce | 119/51.5 |
| 4,034,715 | A | * | 7/1977 | Arner | 119/51.5 |
| 4,134,365 | A | * | 1/1979 | Futers et al. | 119/51.5 |
| 4,270,490 | A | * | 6/1981 | Kopp | 119/61.5 |
| 4,573,434 | A | * | 3/1986 | Gardner | 119/77 |
| 4,840,143 | A | * | 6/1989 | Simon | 119/52.1 |
| 5,259,336 | A | * | 11/1993 | Clark | 119/51.5 |
| 5,488,927 | A | * | 2/1996 | Lorenzana et al. | 119/51.5 |
| 5,699,753 | A | * | 12/1997 | Aldridge, III | 119/52.1 |
| 5,752,464 | A | * | 5/1998 | King et al. | 119/63 |
| 6,378,460 | B1 | | 4/2002 | Skurdalsvold et al. | |
| 6,467,428 | B1 | * | 10/2002 | Andrisin et al. | 119/51.5 |
| 6,863,025 | B2 | | 3/2005 | Ness | |
| 7,040,249 | B1 | | 5/2006 | Mushen | |
| 7,219,623 | B2 | | 5/2007 | Flowers et al. | |
| 7,487,741 | B2 | * | 2/2009 | Jordan | 119/61.54 |
| 2010/0122660 | A1 | | 5/2010 | Willet | |

* cited by examiner

*Primary Examiner* — David Parsley
(74) *Attorney, Agent, or Firm* — Howard Cohen

(57) ABSTRACT

An animal food/water dispensing apparatus provides a base that is invertible for alternative use as a water bowl or a feed bowl in conjunction with a single reservoir container design that is adapted to supply either water or feed to the base, so that a minimum of components are required to assemble an animal waterer or animal feeder. Each face of the base has a container mounting ring and a water trough or feed basin for presenting the flowable material from the reservoir container.

12 Claims, 5 Drawing Sheets

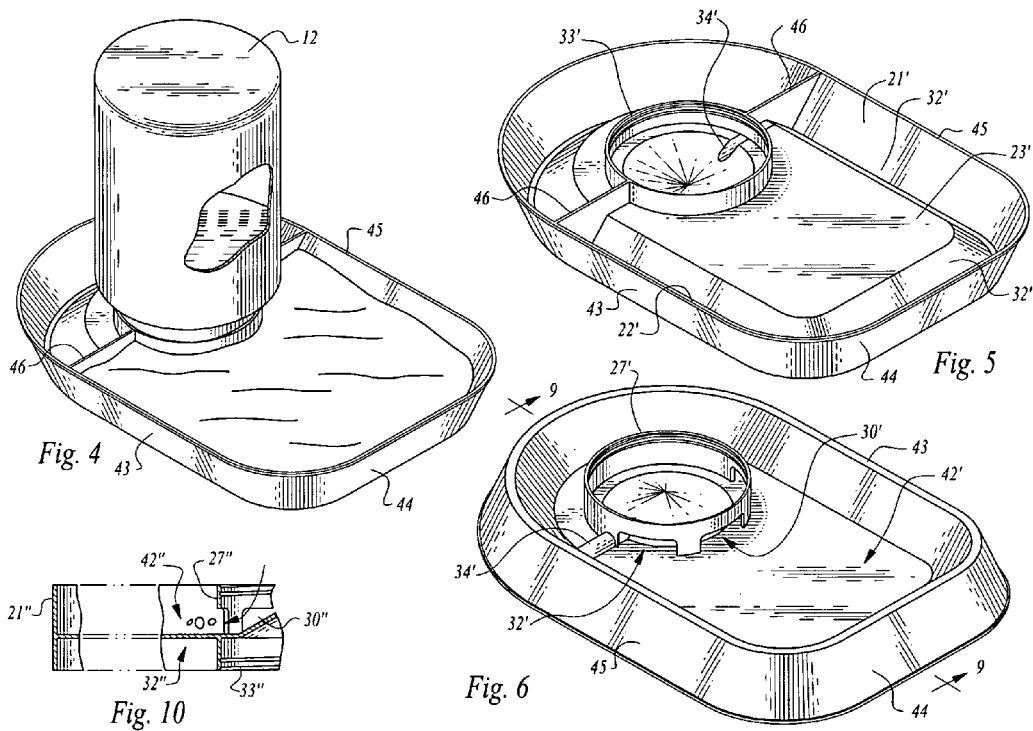

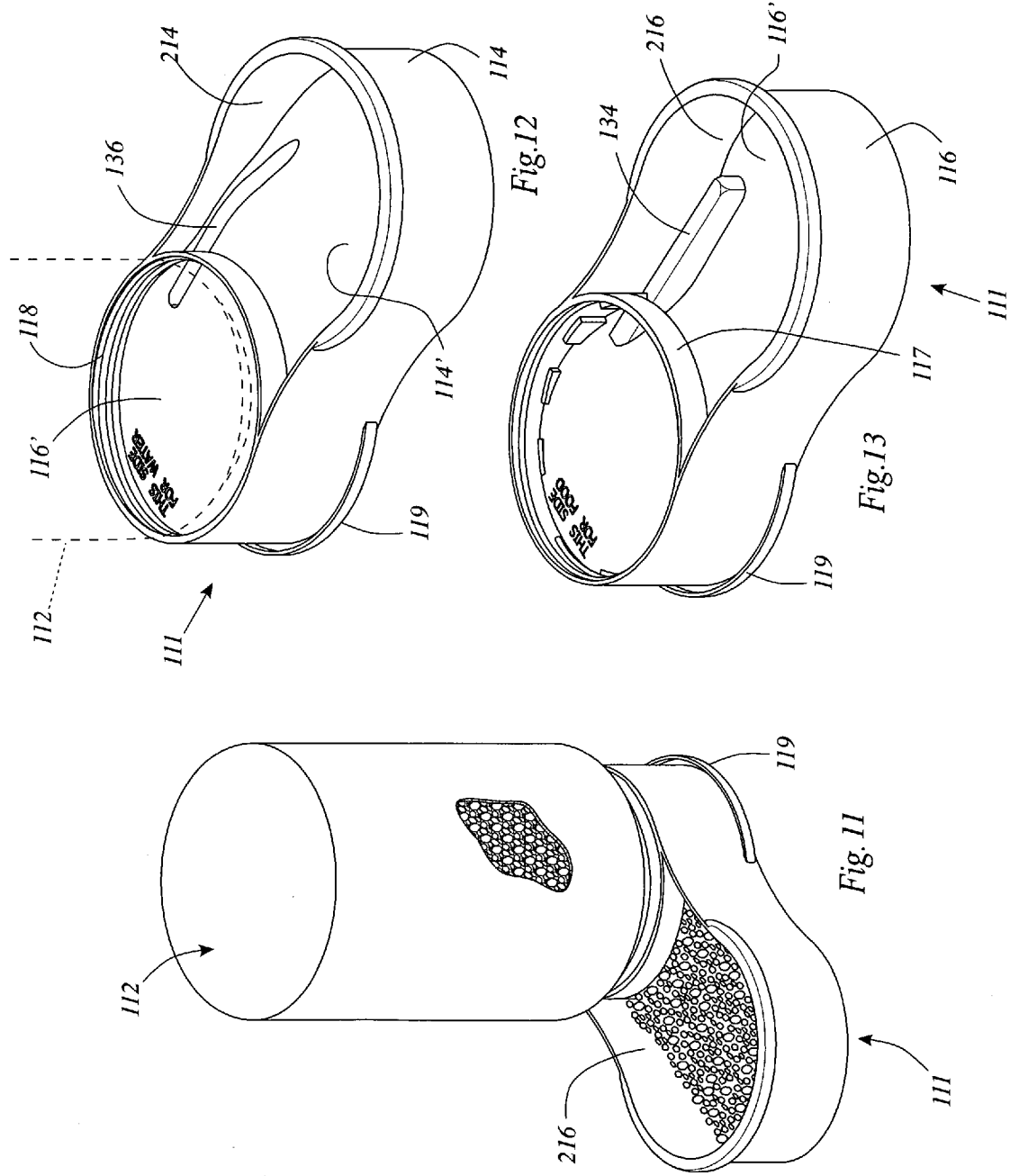

ANIMAL FEED/WATER DISPENSER WITH DUAL-USE INVERTIBLE BASE

CROSS-REFERENCE TO RELATED APPLICATIONS

This application is a continuation-in-part of U.S. application Ser. No. 12/928,018, filed on Nov. 30, 2010, for which priority is claimed

FEDERALLY SPONSORED RESEARCH

Not applicable.

SEQUENCE LISTING, ETC ON CD

Not applicable.

BACKGROUND OF THE INVENTION

1. Field of the Invention

This invention relates to apparatus for feeding and watering animals, including domestic fowl, domestic pets, small livestock, and the like. More particularly, it concerns feeding and watering apparatus that provide a reservoir container supplying an attached, supporting bowl or dish and relying on gravital flow to dispense the feed or water and maintain a supply level in the bowl or dish. For example only, see U.S. Pat. No. D393,108, issued Mar. 31, 1998.

2. Description of Related Art

In the care of animals, the most fundamental tasks are to provide food and water to sustain the animals. The prior art is replete with apparatus for delivering foodstuffs to domestic animals and pets, and for supplying water for drinking. Generally, feed dispensers provide some form of reservoir container that is inverted and connected to a bowl or dish, so that gravital flow will incrementally dispense the feed and maintain a supply level in the bowl for a period of time. One well-known type of water dispenser provides a liquid reservoir that is inverted to open into a drinking bowl, the liquid level in the bowl establishing a dynamic balance between the hydrostatic pressure within the liquid reservoir and the aerostatic pressure acting on the surface of the liquid within the bowl. The water is discharged incrementally from the reservoir so that a water supply may be presented in the bowl for an extended period of time.

Each type of apparatus, whether animal feeder or animal waterer, is typically designed as an assembly of unique components, each bowl and reservoir container being shaped to fit with its mating components. As a result, each apparatus requires the design and production and warehousing and tracking of a number of parts, and these undertakings comprise a hidden business expense that is nonetheless a burden for any business. Therefore, it is useful for a business to reduce the number of components it must manufacture and store.

There have been some modest efforts in the prior art to simplify the components of pet feeder apparatus. Generally, these efforts have focused on the provision and use of a common reservoir container to supply different bowls, whether for compact shipping purposes or to enable interchangeability for cleaning purposes. The bowl component is typically designed and manufactured for a single purpose: water supply or feed supply.

BRIEF SUMMARY OF THE INVENTION

The present invention generally comprises an animal food/water dispensing apparatus that provides a greatly simplified assembly of components to deliver either food or water an animal. A salient aspect of the invention is the provision of a base that is designed for dual use as a water bowl or a feed bowl. The base is invertible to present in upwardly facing fashion either of two dissimilar faces: one face provides a support for an inverted liquid reservoir container and an annular trough from which an animal may drink, and the other face provides a support for an inverted feed reservoir container and a basin-like coffer to receive the feed in incremental flow via gravital force. Thus the base is adapted for either function, and may be turned upside down to select the function by presenting the appropriate face directed upwardly. In this way a single base component may take the place of two previous components, simplifying manufacturing and storing of the apparatus.

A further salient feature of the base of the invention is that it is formed of thin-wall plastic or resin, requiring a minimum of material, and the opposite sides of the walls serve the differing purposes of the opposite ends of the base. For example, the V shape created by two of the side walls defines, when upwardly opening, the annular trough for drinking; when inverted to open downwardly, the V shape forms the periphery of the basin that holds the feed.

In a further aspect, the invention employs a reservoir container that may be used for either feed or water. Use of a single component for both purposes once again simplifies manufacturing, assembly, and storing of parts.

More specifically, in one embodiment the base of the invention is comprised of a first sidewall extending in a closed curve about a longitudinal axis of symmetry and disposed obliquely thereto, one continuous outer edge of the first sidewall being a free edge disposed in a first plane. A second sidewall is disposed concentrically within the first sidewall, with an outer edge of the second sidewall joined to the inner edge of the first sidewall in a V configuration. A central web spans the inner edge of the second sidewall and extends generally transverse to the longitudinal axis. The central web has two surfaces: a first face adjacent to the V configuration of the first and second sidewalls, and a second face that, when opening upwardly, forms, with the second sidewall, a basin that is adapted to hold liquid. Secured to the first face of the central web is a first ring extending coaxially and having a mounting feature for releasably securing an inverted reservoir container supplying water to the adjacent V configuration which comprises an annular trough from which an animal may drink. A second reservoir mounting ring is secured coaxially to the second face of the central web by a plurality of short legs. The second ring secures an inverted reservoir container holding a flowable feed product, and the spacing defined by the legs between the support ring and the central web provides space for the feed product to discharge incrementally from the reservoir and fill the basin.

In a further embodiment, the base of the invention includes an outer sidewall that forms a complex closed curve. The sidewall has first and second cylindrical portions that are laterally adjacent, each cylindrical portion being truncated along a longitudinal plane parallel to the axis of symmetry. The cylindrical portions each describe a solid angle greater than 180°, and the sidewall forms a smooth curved transition between the confronting truncations of the cylindrical portions. Disposed concentrically within one end of one of the cylindrical portions is a mounting ring for releasably securing an inverted reservoir container, and the other cylindrical portion is provided with another mounting ring at the opposed end thereof.

A central web spans the interior opening of the sidewall, the central web extending within each cylindrical portion closely adjacent to the respective mounting ring. An intermediate ramp portion of the central web extends smoothly between the two cylindrical portions. The central web includes a rib formed therein and extending between the two cylindrical portions, the rib forming on one side of the central web a hollow channel that establishes flow communications from one cylindrical portion to the other.

With the base disposed with one continuous edge of the sidewall in ground-engaging contact, one of the mounting rings is supported in its upwardly facing cylindrical portion and available to support the inverted reservoir container. The central web ramps downwardly from the mounting ring area and forms, in conjunction with the interior surface of the sidewall of the other cylindrical portion, a feed basin. Thus the inverted container may be filled with granular dry feed, and it will flow down the ramped portion and discharge incrementally from the reservoir and fill the basin and maintain it in a filled state.

With the base inverted and supported on the opposed continuous edge of the sidewall, the other mounting ring is supported in its upwardly facing cylindrical portion to support the inverted reservoir container. The central web ramps downwardly from the mounting ring area and forms, in conjunction with the interior surface of the sidewall of the other cylindrical portion, a water basin. The hollow channel of the central web extends from beneath the inverted reservoir container to the water basin, and forms a hydrostatic water supply that maintains a usable water level in the water basin.

BRIEF DESCRIPTION OF THE DRAWING

FIG. 4 is a perspective view of a further embodiment of the invention, shown assembled and oriented in the water dispensing orientation.

FIG. 5 is a perspective view of the base of the animal feed/water dispenser of FIG. 4, shown in the water dispensing orientation.

FIG. 6 is a perspective view of the base of the animal feed/water dispenser of FIG. 4, shown in the feed dispensing orientation.

FIG. 10 is an enlarged cross-sectional partial elevation of the sidewall and central web of a further embodiment of the invention.

FIG. 11 is a perspective elevation of another embodiment of the invention.

FIG. 12 is a perspective elevation of the base of the embodiment of FIG. 11, shown in the water dispensing orientation.

FIG. 13 is a perspective elevation of the base of the embodiment of FIG. 11, shown in the feed dispensing orientation.

DETAILED DESCRIPTION OF THE INVENTION

The present invention generally comprises an animal food/water dispensing apparatus that provides a greatly simplified assembly of components to deliver either food or water to an animal. A significant aspect of the invention is the provision of a base that is designed to be invertible for alternative use as a water bowl or a feed bowl. Likewise, the invention provides a single reservoir container design that is adapted to supply either water or feed to the base, so that a minimum of components are required to assemble an animal waterer or animal feeder.

Figure 1:
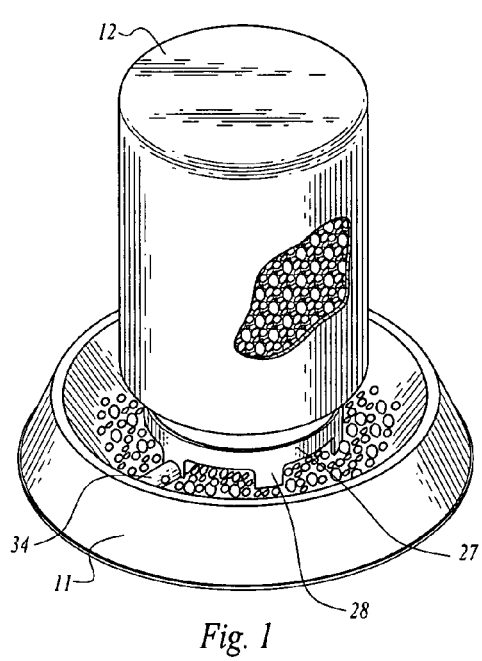
FIG. 1 is a perspective elevation of one embodiment of the animal feed/water dispenser featuring the dual-use invertible base of the present invention.
Figure 2:
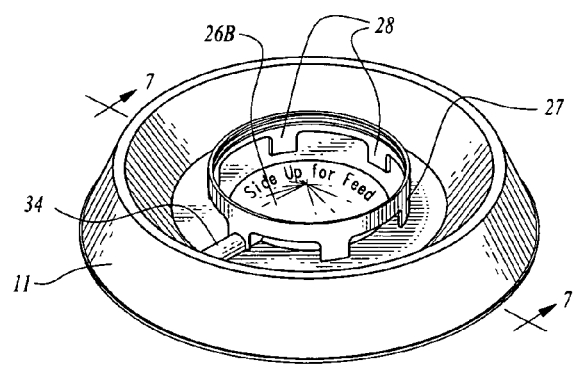
FIG. 2 is a perspective view of the base of the animal feed/water dispenser of the invention, shown in the feed dispensing orientation.
Figure 3:
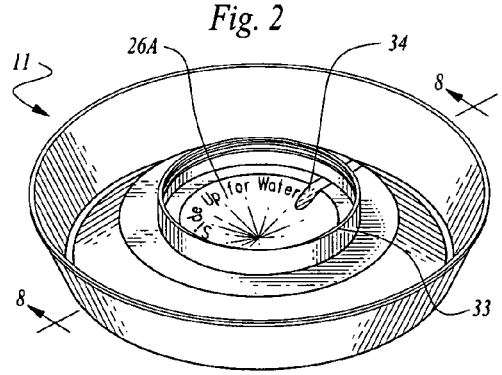
FIG. 3 is a perspective view of the base of the animal feed/water dispenser of the invention, shown in the water dispensing orientation.

With regard to FIGS. 1-3, one embodiment of the invention is composed of two components: a base 11 and a reservoir container 12. The container 12 comprises generally a wide mouth jar or bottle that is adapted to be inverted and supported by the base to provide either water or feed to the base (in FIG. 1 the container 12 is supplying feed to the base).

Figure 7:
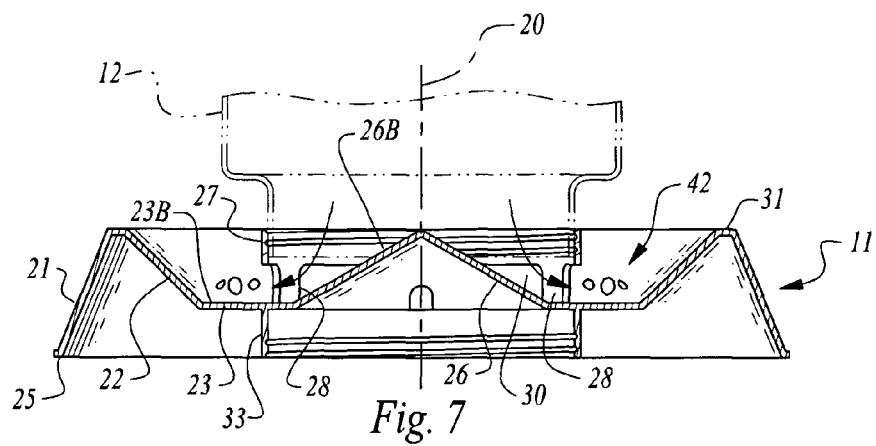
FIG. 7 is a cross-sectional elevation of the base of the first embodiment, taken along line 7-7 of FIG. 3 and inverted to show the feed dispensing orientation.
Figure 8:
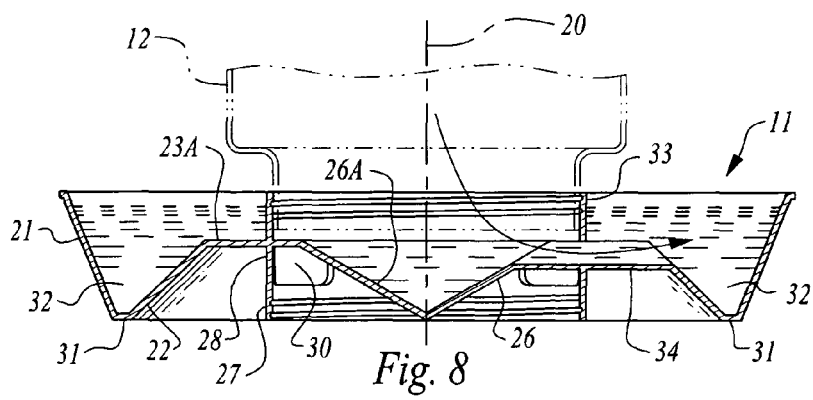
FIG. 8 is a cross-sectional elevation of the base of the first embodiment, taken along line 8-8 of FIG. 2 and inverted to show the water dispensing orientation.
Figure 9:
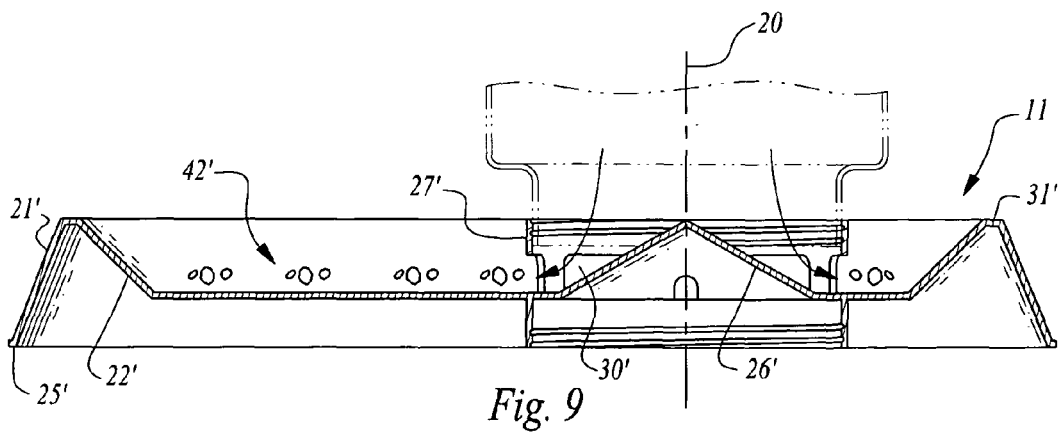
FIG. 9 is a cross-sectional elevation of the base of the second embodiment, taken along line 9-9 of FIG. 6.
Figure 14:
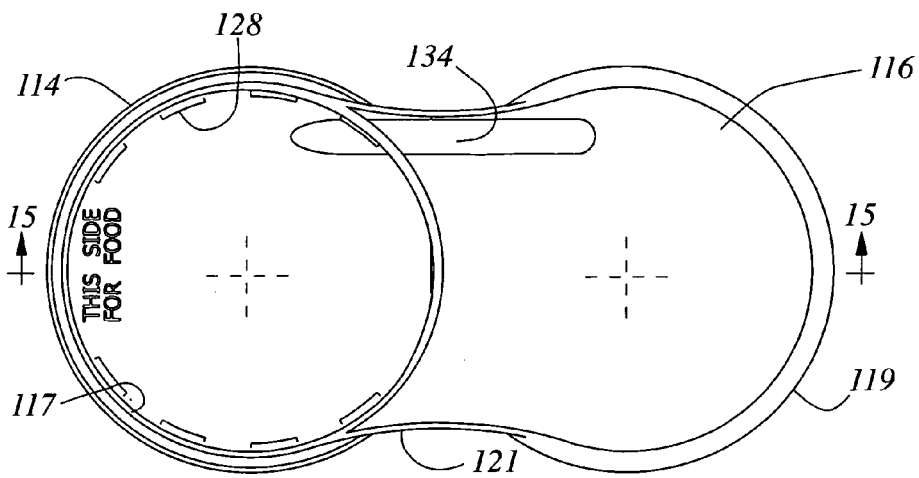
FIG. 14 is a layout view of the base of the embodiment of FIGS. 11-13, shown in the feed dispensing orientation.
Figure 15:
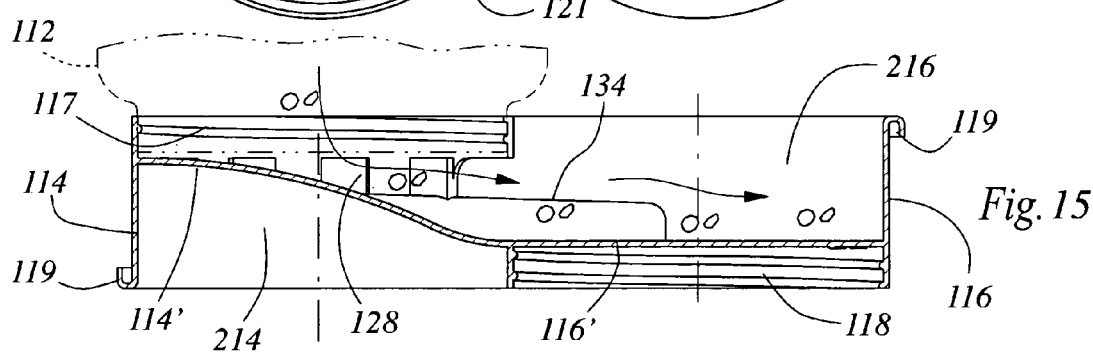
FIG. 15 is a cross-sectional elevation taken along line 15-15 of FIG. 14.
Figure 16:
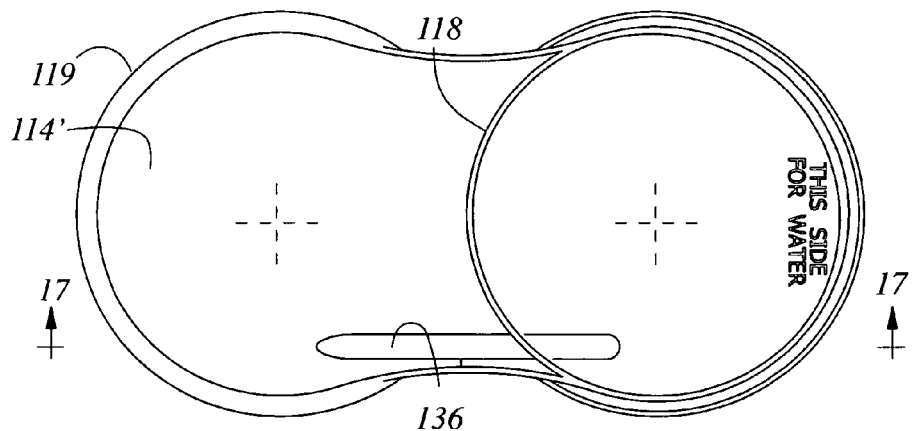
FIG. 16 is a layout view of the base of the embodiment depicted in FIGS. 11-15, shown in the water dispensing orientation.
Figure 17:
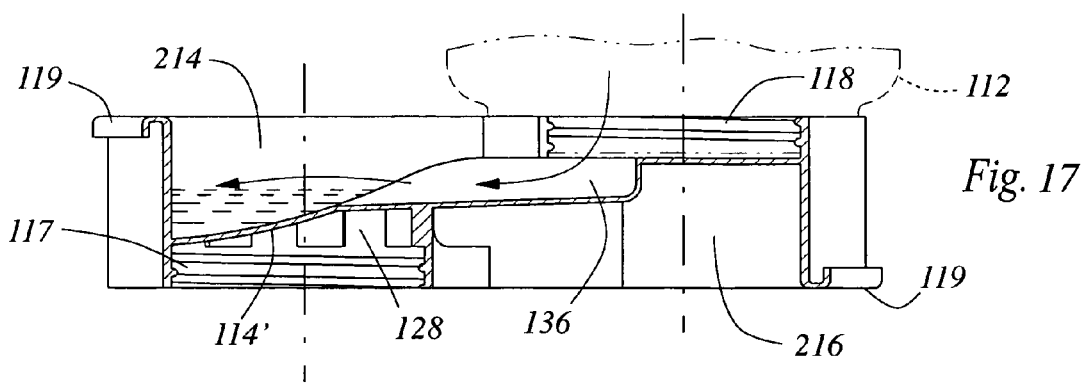
FIG. 17 is a cross-sectional elevation taken along line 17-17 of FIG. 16.

With reference to FIGS. 7 and 8, the base 11 is formed of thin-walled portions of plastic, resin, or polymer materials, the thin-walled portions having opposed faces that provide distinctly different functions. A first sidewall 21 is formed in a closed curve about an axis of symmetry 20, the sidewall being oblique to the axis 20. One continuous outer edge 25 of the sidewall 21 is a free edge that extends in a first nominal plane. Disposed concentrically within the sidewall 21 is a second sidewall 22, and an outer edge of sidewall 22 is joined to the inner edge of sidewall 21 to form an apex that defines an annular land 31. The included angle between the sidewalls 21 and 22 defines a V configuration that forms a annular trough 32 when the base is disposed in the watering orientation, as will be explained below.

Disposed within the second sidewall 22 is a central web 23 extending generally transversely to the axis 20. The web 23 is joined to the inner edge of the sidewall 22 in continuous fashion, spanning the inner edge. Note that due to the fact that the sidewall 22 has a shorter axial extent than the outer sidewall 21, the inner edge of sidewall 22 supports the central web 23 in a position intermediate the plane of the outer edge 25 and the annular land 31. The central web is provided with a shallow conical protrusion 26 that is symmetrical with axis 20. As shown in FIG. 7, the conical projection serves to spread radially the feed dispensed from the reservoir container 12. The central web has two surfaces: a first face 23A (FIG. 8) adjacent to the V trough 32 of the first and second sidewalls, and a second face 23B (FIG. 7) that, when facing upwardly, forms, with the second sidewall, a basin 42 that is adapted to hold granular or flowable feed products (grains, seeds, kibbles, and the like).

Secured to the first face 23A of the central web is a first ring 33 aligned coaxially and having a mounting feature for releasably securing the mouth of the inverted reservoir container 12. In the preferred embodiment the mounting feature is an interior annular threaded surface that engages a complementary threaded annular exterior surface extending about the mouth of the container 12.

However, other mounting expedients, such as bayonet mount, press fit, gasket mount or the like may be used. With particular regard to FIG. 8, the base 11 further is provided with a rib 34 extending generally radially from a point within the perimeter of the ring 33 to a point intersecting the sidewall 22. The rib 34 is a hollow channel that establishes flow communications between the interior of the container 12 and the annular trough 32, thereby supplying water to the adjacent trough as it is consumed.

Secured to the second face 23B of the central web is a second ring 27 aligned coaxially and having the same mounting feature as mounting ring 33 for releasably securing the inverted reservoir container 12. Note that the ring 27 is secured to the face 23B by a plurality of legs 28 spaced evenly about the ring to define openings 30 between the ring 27 and the face 23B that enable the movement of a flowable animal feed product from the interior of the container 12 to the basin 42. That movement is aided by the conical protrusion 26B which deflects the downward gravital flow to a radially outward path, as indicated by the dotted line arrows in FIG. 7.

It should be noted that, as shown in FIGS. 7 and 8, the axial length of ring 33 is sufficient so that it extends to be approximately flush with the nominal plane of the outer free edge 25 of sidewall 21. Likewise, the axial length of ring 27 is sufficient so that it extends to be generally flush with the plane in which the annular land surface 31 is disposed. Given the coaxial alignments of the rings 27 and 33, it is clear in FIGS. 7 and 8 that when one face of the base 11 is pointed downwardly in the ground-engaging position, the aligned rings transfer the weight load from the uppermost ring 27 or 33, which is supporting the container 12, to the lowermost ring 33 or 27, respectively, which is in the ground-engaging position. This arrangement reduces weight load and strain on the base assembly, extending its durability and longevity.

With regard to FIGS. 4-6 and 9, there is illustrated a further embodiment of the invention that is similar in many aspects to the previous embodiment, and similar components are labeled with the same reference numerals having a prime (') designation. This embodiment is designed to be suitable for domestic pets and the like, and employs the same arrangement of sidewalls 21' and 22' and the central web 23' supporting the mounting rings 27' and 33'. As shown in FIGS. 4-6, a salient change in this embodiment is that approximately 180° of the sidewall structures have been extended from their previous axial symmetry to form three linear sidewall portions 43, 44, and 45. These sidewall portions are arrayed in a rectangular configuration with large radius rounded corners. Indeed, an interior wall 46 extends diametrically from ring 33'to the adjacent surfaces of sidewalls 21 and 22, forming a closed rectangular configuration with sidewall portions 43-45. Thus the trough 32' is no longer annular; rather, it extends within the confines of sidewall portions 43-46 in the V opening of sidewalls 21' and 22'. Note that the radial rib 34' extends from within the ring 33' to the trough 32', so that the water from reservoir container 12 is directed into the rectangular portion, and excluded from the annular portion of the trough. The central web 23' extends as before to span the sidewall portions 43-45 and define a leakproof pan. This arrangement provides a larger watering trough that is more appropriate for domestic pets.

With regard to FIG. 10, a further embodiment of the invention employs a minimalist design to achieve the desirable features of the two-sided base assembly, and components corresponding to previously described parts are accorded the same reference numeral with a double prime (") designation. The outer sidewall 21" is oriented to extend transversely to the central web 23", the inner sidewall is eliminated, and the central web is joined at its periphery to the inner surface of the sidewall 21" Note that the central web is spaced unequally in the longitudinal direction, whereby the central web and sidewall 21" form a basin 42" for granular feed products that are delivered from a reservoir container secured to support 27". In the inverted disposition, the annular trough is eliminated and the sidewall 21" and web 23" form a liquid basin 32" to contain and present water that is supplied by a reservoir container secured to support 33". This embodiment provides the same two-sided dual functionality using a minimum of materials while providing a high value, innovative product.

In the feed dispensing orientation of FIG. 6, the basin 42'is significantly larger than the previous embodiment, whereby more feed may be presented to the animals being cared for, and there is more space for an animal such as a dog or cat to eat comfortably. Note that the openings 30' for the feed are located about the ring 27' so that they discharge only into the basin 42', not into the annular trough portion.

Another embodiment of the invention, shown in FIGS. 11-17, is also comprised of a base 111 having opposed end faces and an inverted reservoir container 112 that is adapted to be supported by either end face to supply feed or water to animals. The base 111 includes an outer sidewall 121 of generally uniform width that forms a complex closed curve comprised of two semi-cylindrical portions 114 and 116 that are laterally adjacent. Each of these cylindrical portions is truncated along a longitudinal plane parallel to their axes of symmetry, and the cylindrical portions each describe a solid angle greater than 180°. The sidewall 121 also forms a smooth continuous curved transition between the confronting truncations of the cylindrical portions.

Secured concentrically within each of the semi-cylindrical portions 114 and 116 is one of a pair of mounting rings 117 and 118, each ring being adapted to releasably secure an inverted reservoir container 112, as described in the previous embodiments, when the respective ring is disposed in an upwardly facing orientation. Each mounting ring is disposed at one axial end of its respective cylindrical portion, with the ring flush with the adjacent edge of the outer sidewall 121. Note that the ring 117 is supported by legs 128 similar to the legs 28 of mounting ring 27 described in the previous embodiments for dispensing granular feed. At the opposed end of each cylindrical section a flange 119 extends about the edge of the sidewall 121 where it describes the cylindrical curve. The flange 119 strengthens the edge and aids in resisting biting or gnawing by the animal using the feeding assembly. The flange also assists in transferring the weight of the inverted reservoir 112 disposed thereabove to the supporting floor or ground surface.

The base 111 also includes a central web 123 comprised of a thin, form-retaining wall that spans the entirely of the interior surface of the sidewall 121. The web 123 includes a generally planar portion 116' that extends within cylindrical portion 116 and is generally transverse to the axis of the cylindrical portion 116 and mounting ring 118. The web portion 116' transects the cylindrical portion 116, defining on one side a feed basin 216 having a flat bottom and bounded by the curved sidewall 116.

The web 123 also includes a portion 114' that extends within and transects cylindrical portion 114, the web portion 114' extending obliquely to the axis of the cylindrical portion and defining a ramp surface between cylindrical portions 114 and 116. The clearance between web portion 114' and mounting ring 117 enables granular feed products to flow therebetween and fill the feed basin 216. Web portion 114' defines on one side thereof a water basin 214. A rib 134 is formed in the central web 123, extending between the two areas 114' and 116'. The rib 134 defines on one side a channel 136 that enables liquid flow communication from an inverted reservoir container 112 supported on mounting ring 118 to water basin 214. The container 112 forms a hydrostatic liquid supply that maintains and makes available a quantity of water in the basin 214. The rib 134 on its other side comprises a shallow protrusion into feed basin 216 that does not interfere with the flow of granular feed.

The utilization of the embodiment of FIGS. 11-17 is substantially similar to the previous embodiments. To employ the assembly as a water dispenser for pets and other animals, the reservoir container 112 is filled with water and the mounting ring 118 is secured to the mouth of the container 112. Thereafter the assembly is placed on a horizontal surface with the water basin 214 opening upwardly (FIGS. 12 and 17) and the container 112 inverted to supply the basin with water by hydrostatic effect, as is known in the art. The water flows from container 118 through channel 136 to maintain the water level in basin 214. The mounting ring 117 and feed basin 216 are facing the floor or ground surface and are not visible.

To employ the assembly as a feed dispenser for pets and other animals, the reservoir container 112 is filled with granular or other flowable dry animal food and the mounting ring 117 is secured to the mouth of the container 112. Thereafter the assembly is placed on a horizontal surface with the feed basin 216 opening upwardly (FIGS. 11 and 15) and the container 112 inverted to supply the basin 216 with feed by gravity effect, as is known in the art. That is, the granular feed will flow down the ramped web portion 114' from the mouth of the container 112 to the feed basin 216, and will be replenished by gravital flow as it is consumed.

In the embodiments depicted some desirable but not necessarily required geometric relationships have been shown. For example, the plane in which free edge 25 is disposed is generally parallel to the plane in which annular land 31 is located. The size of the openings 30 or 30' is dimensioned empirically to enable sufficient flow of feed to keep the basin supplied. As indicated partially in FIG. 2, the surface 26B of the conical protrusion (adjacent to surface 23B) may be embossed or imprinted with the legend "This side up for feed." Likewise, the surface 26A may display the legend "This side up for water" (FIG. 3), so that a new user of the apparatus cannot be confused by the one choice available: which face of the base should be assembled to the reservoir container.

Thus it may be appreciated that the invention provides an animal feeding apparatus in which two components, a base and a reservoir container, may be assembled to create either a feed dispenser or a water dispenser, and that the reduction in the number of components leads to economies of scale in manufacturing and inventory of parts. Furthermore, the same kind of economies are realized in the retail field, where proprietors need stock far fewer items in order to fill the need for watering and feeding apparatus, and the task of re-ordering parts is also greatly simplified.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. An apparatus for dispensing feed or water to an animal, including:
    a base assembly and a reservoir container adapted to be releasably secured to said base assembly;
    said base assembly including a base having first and second faces on obverse sides of said base;
    said reservoir container comprising a closed container having an opening with a mouth;
    first means extending from said first face and capable of supporting said container by releasably engaging said mouth with said container inverted;
    second means extending from said second face and capable of supporting said container by releasably engaging said mouth with said container inverted;
    said first and second means being offset in a lateral direction;
    said base being movable from a first assembly position in which said first face is directed upwardly and said inverted container is secured to said first means and said second face is in ground engagement to support said apparatus, to a second assembly position in which said second face is directed upwardly and said inverted container is secured to said second means and said first face is in ground engagement to support said apparatus.

2. The apparatus of claim 1, wherein said base includes an outer sidewall having a closed curved configuration that includes first and second semi-cylindrical portions.

3. The apparatus of claim 2, wherein said first and second semi-cylindrical portions are each truncated along a longitudinal plane parallel to the cylindrical axis.

4. The apparatus of claim 3, wherein the truncations of said first and second semi-cylindrical portions are in confronting relationship, and said first and second semi-cylindrical portions are separated by said offset in said lateral direction.

5. The apparatus of claim 2, wherein said first and second means for supporting said container comprise first and second mounting rings having a mounting feature for releasably securing said mouth of said container.

6. The apparatus of claim 5, wherein each of said first and second mounting rings are secured in respective said first and second semi-cylindrical portions, each of said mounting rings disposed concentrically within the respective semi-cylindrical portion and at opposed axial ends thereof.

7. The apparatus of claim 6, further including a central web comprised of a thin, form-retaining panel, said central web extending to span across the entirety of the interior surface of said outer sidewall in continuous fashion.

8. The apparatus of claim 7, where said central web includes a first panel portion that spans said interior surface of said outer sidewall of said first semi-cylindrical portion, said first panel portion and said outer sidewall defining at said first face a feed basin for presenting granular feed products.

9. The apparatus of claim 8, wherein said central web includes a second panel portion that spans said interior surface of said outer sidewall of said second semi-cylindrical portion, said second panel portion and said outer sidewall defining at said second face a water basin.

10. The apparatus of claim 8, wherein said first panel portion extends closely adjacent to said first mounting ring, and further including a channel extending between said first and second panel portions, said channel directing liquid flow from an inverted container supported by said first mounting ring to said water basin.

11. The apparatus of claim 10, wherein said second panel portion extends from a location adjacent to said second mounting ring to slope in ramp-like fashion toward said feed basin, whereby granular feed will flow by gravital effect into and fill said feed basin.

12. The apparatus of claim 6, wherein each of said first and second rings is substantially flush with the outermost axial extent of said first and second faces of said base, whereby said first or second ring forms a portion of said ground engagement when said apparatus is in said second or first assembly position, respectively.

* * * * *